United States Patent [19]

Schaub et al.

[11] Patent Number: 4,722,112
[45] Date of Patent: Feb. 2, 1988

[54] ROLLER BACK WIPER

[75] Inventors: Erwin L. Schaub, Manhasset; Frank J. Viola, Uniondale, both of N.Y.

[73] Assignee: Parker Hannifin Corporation, Cleveland, Ohio

[21] Appl. No.: 863,289

[22] Filed: May 15, 1986

[51] Int. Cl.4 .............................................. B60S 1/38
[52] U.S. Cl. ................................................ 15/250.36
[58] Field of Search ............ 15/250.33, 250.36–250.42

[56] References Cited

U.S. PATENT DOCUMENTS 3,238,555  3/1966  Cels ............................. 15/250.36 X
4,513,468  4/1985  Hayden ......................... 15/250.36
4,649,592  3/1987  Bénéteau ....................... 15/250.36

FOREIGN PATENT DOCUMENTS 838316  6/1960  United Kingdom ............. 15/250.36

Primary Examiner—Peter Feldman
Attorney, Agent, or Firm—Joseph B. Balazs

[57] ABSTRACT

A windshield wiper assembly includes a flexible wiper element and a semi-rigid backing strip, the wiper element having a curved roller back configuration to maintain the point of contact with the backing strip substantially directly above the wiper lip to reduce the force necessary to flip the wiper element upon reversal of wiping motion. The wiper element includes an involute tooth and head to retain the wiper element in the backing strip and to allow relatively unrestricted floating movement therein.

7 Claims, 7 Drawing Figures

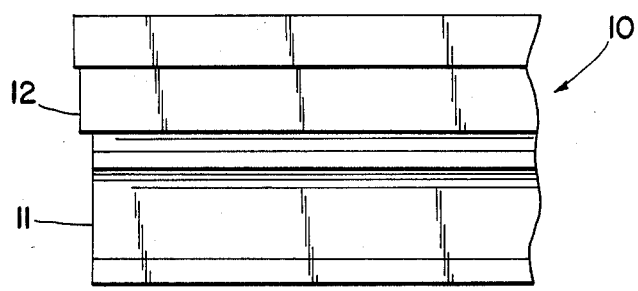
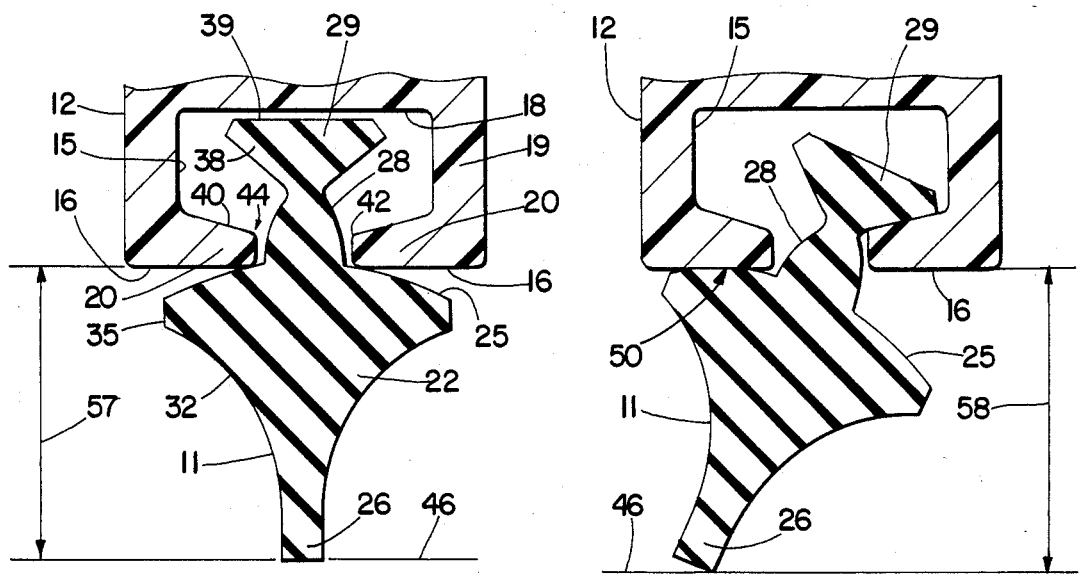
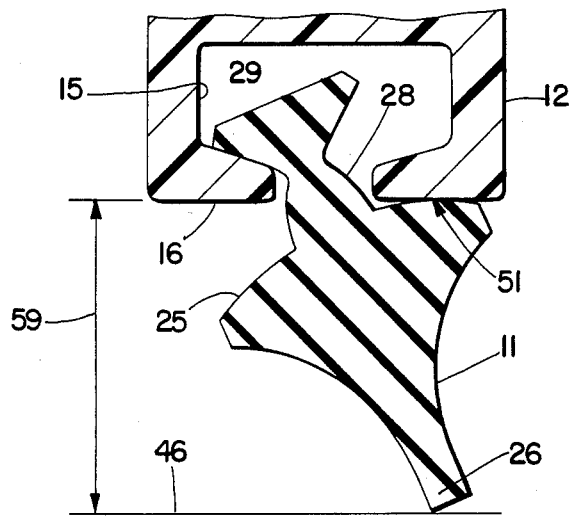
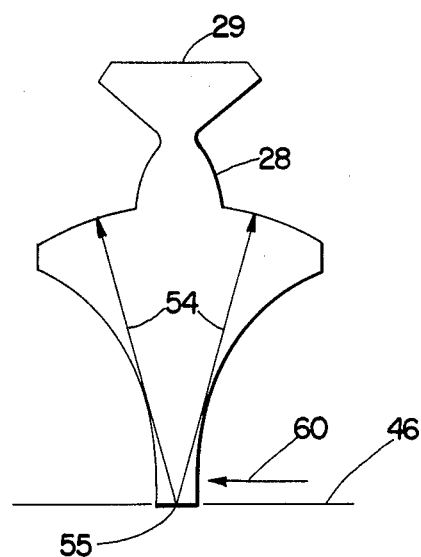

ROLLER BACK WIPER

BACKGROUND OF THE INVENTION

This invention relates to windshield wiper assemblies for automobiles and the like, and more particularly, to an improved wiper assembly which provides a better pivoting action than prior art devices.

A typical problem for windshield wipers is the failure of the wiper to flip from side to side when reversing the direction of motion. Consequently, the wiper element is forced along the windshield in an unpredictable manner often resulting in chatter or the like, but in any event, not providing the proper cleaning action. Such failure to flip is caused by many different factors including for example, the set of the wiper element or other aging characteristics, the strength of the spring holding the assembly against the glass, and the friction characteristics at the glass wiper interface. Still further factors include the curvature of the windshield, the force applying design of the superstructure portion of the wiper blade and the requirement inherent in many prior art designs that the wiper element flex throughout its length and lift the wiper superstructure against the force of the wiper spring. It is with this last parameter that the instant invention is primarily concerned.

Conventional wiper designs make use of a wiper section which is hinged in one of two manners. In each of these cases there is a main body of the wiper which flips at the end of a stroke. The flipping action is brought about by the change in direction at the end of a stroke and the fact that the friction coefficient is high enough to provide a horizontal force which acts on the strut shaped wiper body to cause it to flip over center.

One of these designs makes use of a hinge comprised of the rubber body section which rotates in the slot of the backing strip. This type of hinge has limited elastic properties and may be described as a "pivoted" hinge. Another popular type of hinge consists of a thin connecting strip of rubber which connects the body portion of the wiper to a base portion which in turn is attached to the backing strip. Here the flipping action occurs by the rotation of the body portion, using the thin connecting strip as a hinge. The thickness of this hinge is not so small that it has negligible bending resistance. It has a reasonable thickness and acts as an elastic member which bends to accomplish the flip but also attempts to restore itself to its straight unstressed position. This type of action can be referred to as an "elastic" hinge since it stores energy in being bent in one direction. This energy is released to assist the return to a center position prior to being flipped into the new reversed direction.

Since both of these designs depend upon the wiper body acting as a strut, both require a certain minimum friction between wiper and windshield in order to get the body portion to rise during reversal and then fall off toward the opposite side. As noted, a major problem with getting this to happen is that the wiper body shape becomes distorted with time. In part, this distortion occurs because of the downward pressure of the wiper arm which bends the lip and holds it bent over a period of months, causing a set in the rubber material and a permanently bent shape of the lip. This bend changes the angle that the strut makes with the windshield. When this angle becomes low enough the available friction is no longer sufficient force to raise the frame and bring the wiper body into the over center position.

SUMMARY OF THE INVENTION

A solution to this problem is provided by the instant invention in allowing the hinge point between the wiper element and the backing strip to change locations instead of being fixed in one place. This is done in one embodiment of the invention by having the upper surface of the wiper body in a circular arc with its center located at the midpoint between the wiping edges. This makes the action of the wiper behave as though it were a roller in that as the wiper goes from one flip position to the other, it literally rolls on its upper surface. In doing so, the wiper need not lift the superstructure against the spring force to assume a reversed position, but rather achieves this in a smooth transition of rolling action.

Significant as well to this development is the device for retaining the wiper element in the backing strip. Securement must be achieved while allowing freedom of movement and this is provided in the instant structure by a novel involute tooth shaped neck on the wiper element and an enlarged head which rocks from side to side within the channel groove of the backing strip, with only limited supportive contact.

Additional consideration is given to the profile of the wiper element to further reduce the effects of set of the rubber material and this is achieved in a more or less uniformly stressed structure which reduces the peak stress level at any location therein.

BRIEF DESCRIPTION OF THE DRAWINGS

FIG. 1 is a view in elevation of a portion of the wiper assembly of the invention showing a wiper element secured in a backing strip in a central, unrocked position therein;

FIG. 2 is a cross sectional view of a part of the wiper blade assembly of FIG. 1;

FIGS. 3 and 4 are cross sectional views of the wiper blade assembly similar to that of FIG. 2, showing the wiper element in forward and reversed rocked positions;

FIG. 5 is an end view of the wiper element of the invention removed from the backing strip to show some of the details of its construction;

DETAILED DESCRIPTION OF THE INVENTION

Figure 6:
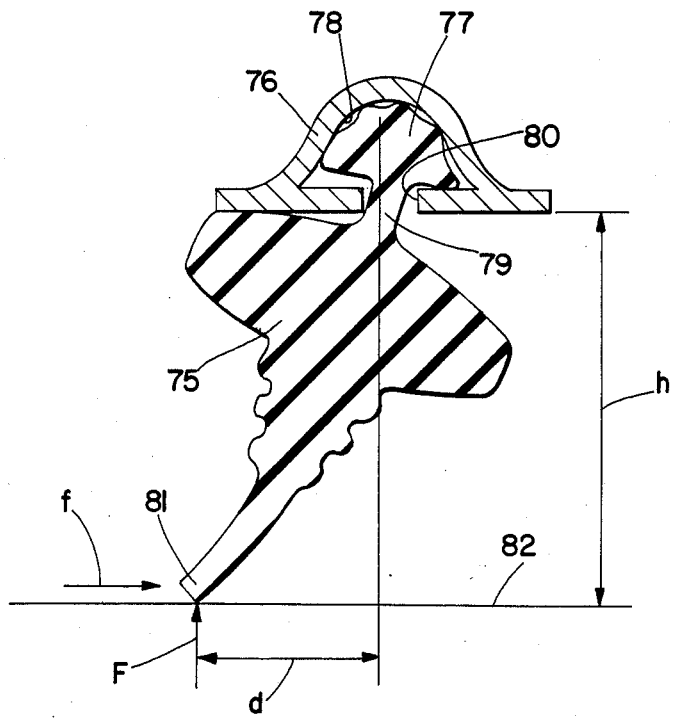
FIG. 6 is a cross sectional view of a pivoted type prior art wiper element and backing strip and FIG. 7 is a cross sectional view of an elastic hinge type prior art wiper element and backing strip.

Referring now to the drawings, there is shown in FIGS. 1-5, one embodiment of the invention of wiper assembly 10 consisting of wiper element 11 and backing strip 12. Wiper assembly 10 is conventionally mounted in an appropriate superstructure consisting of various support members in turn mounted in a wiper arm and adapted to be driven for oscillation against the windshield of an automobile or the like. Typically, the wiper arm is spring loaded to place the wiper assembly in compression against the windshield in order to achieve suitable wiping contact.

Backing strip 12 is of channel-shaped cross section and typically is a semi-rigid plastic extrusion of extended length having channel 15 therein. Backing strip 12 may take many different configurations, but essentially comprises channel 15 for retaining wiper element 11 and lower bearing surface 16 for operating cooperation with the wiper element. Channel 15 is formed by a generally transverse inner face 18 of backing strip 12, depending legs 19 and inwardly facing, spaced arms 20, the lower surface of the latter forming the bearing surface 16.

Wiper element 11 is also an extruded element typically of elastomeric material and comprising body portion 22, curved back 25 at an upper part of body portion 22, wiper lip 26 at a lower part thereof, and a neck 28 and head 29 projecting upwardly from back 25, the neck 28 and head 29 comprising a means for retaining the wiper element 11 in backing strip 12.

Body member 22 is generally of triangular cross section having a relatively wide back portion 25 and tapering gradually downward to a relatively narrow wiper lip 26, in this instance being formed of relatively smooth curves 32 tapering inwardly from outer shoulders 35 to wiper lip 26. Similarly, the means for retaining wiper element 11 may take different configurations but in this embodiment comprises neck 28 in the form of an involute tooth, curving upwardly and inwardly and terminating in enlarged head portion 29. Body 22 is preferably in a configuration wherein substantially equal stress is distributed therethrough so as to avoid the situations wherein localized set of the elastomeric material forming body 22 is encountered. In such situations wiper element 11 sustains a permanently distorted configuration, considerably altering the force characteristics relative to the windshield being wiped and affecting the performance of the wiper assembly.

In this embodiment of the invention head 29 of wiper element 11 is also generally of triangular cross section being formed of upwardly, and outwardly angled surfaces 38 and transverse upper surface 39. Referring as well to FIGS. 3 and 4, it will be seen that surfaces 38 are angled and of such dimension as to substantially conform to angled surfaces 40 forming the upper portion of arms 20 when wiper element 11 is rocked from one extreme to the other relative to backing element 12. As noted, the lower bearing surface 16 of arms 20 of backing strip 12 are substantially transversely flat, with arms 20 terminating at spaced inner ends 42, the latter defining an entrance opening 44 to channel 15.

With respect to FIGS. 2-4, it is seen that wiper element 11 assumes different angular orientations with respect to backing strip 12 as the latter is reciprocally transversed across the windshield of an automobile or the like by a suitable windshield wiper drive assembly (not shown). Backing strip 12 is moved generally in a planar transverse movement from side to side, retaining the same general disposition with bearing surfaces 16, remaining substantially parallel with the surface of a windshield depicted by lines 46. In this transverse movement wiper element 11 is rocked from one extreme angular disposition relative to backing element 12 as shown in FIG. 3 to the other extreme angular disposition shown in FIG. 4. In FIG. 3 it will be noted that back 25 of wiper element 11 engages bearing surface 16 at point 50, substantially vertically above wiper lip 26 and in FIG. 4 engages bearing surface 16 at point 51, also substantially vertically above wiper lip 26. In an intermediate position as depicted in FIG. 2, back 25 engages bearing surface 16 at the innermost ends 42 of bearing surface 16, substantially at entrance 44 and also vertically above wiper lip 26.

As seen more clearly in FIG. 5, back 25 of wiper element 11 is formed of a generally circular curve having a radius depicted by arrows 54, drawn from center or origin 55, at the center of wiper lip 26. Because back 25 is of circular curvature it will be apparent in the ideal situations depicted, that wiper element 11 will rock between extreme angular dispositions relative to backing element 12, by way of the rolling contact between back 25 and bearing surface 16, without having to lift backing strip 12 away from windshield 46 against the weight of the wiper superstructure and the force of a wiper spring (not shown). It will be apparent that the dimension between backing element 16 and windshield 46 as depicted respectively by arrows 57, 58, 59 in FIGS. 2-4 is substantially the same, since this is substantially equal to the radius of curvature of the back 25 of wiper element 11.

Referring again to FIG. 5, the force available to move the wiper element to its various angular dispositions is that friction force indicated by arrow 60 developed between wiper lip 26 and windshield 46. Force 60 is a function of many parameters including among others the smoothness of windshield 46, the surface condition thereof (i.e., wet, iced, dry, etc.), the surface condition of the wiper lip 26 (i.e. chlorinated, oxidized, untreated), force of the wiper spring, and the like. Needless to say, the force 60 developed is variable and the range so wide that it is difficult to design a wiper structure which will accommodate all extremes. This design constraint is alleviated to a great extent in the instant invention in that only a minimal force is required to roll the wiper element 11 to the various positions depicted, since only a rolling action is encountered between the back 25 and the support surface 16, with little substantial lifting force required. Even if the wiper element 11 takes a set after considerable aging, an essential rolling action is still maintained, requiring a minimum of force as 60, for causing flipping of the wiper element 11.

In this embodiment of the invention, it is essential to provide relatively unrestricted movement of wiper element 11 and yet retain the element in backing strip 12. This is achieved by the neck 28 and head 29 configuration which allows relatively free movement within channel 15. Channel 15 is sized so that upper surface 39 of head 29 is spaced closely to inner surface 18, when wiper element 11 is in the central position of FIG. 2, with legs 19 separated sufficiently to allow head 29 to rock freely to either side. In the fully rocked position of FIGS. 3 and 4, angled surfaces 38 of head 29 are in engagement with upper surfaces 40 of arms 20.

It is desired to keep entrance opening 44 small to retain wiper element 11 and yet allow free rocking movement and this is achieved in part by the curved surface of neck 28 which is in the configuration of an involute tooth. This allows substantially free sliding movement of neck 29 in opening 44 between the positions indicated, the movement of wiper element 11 being primarily dictated by the rolling engagement of back 25 with support surface 16.

Figure 7:
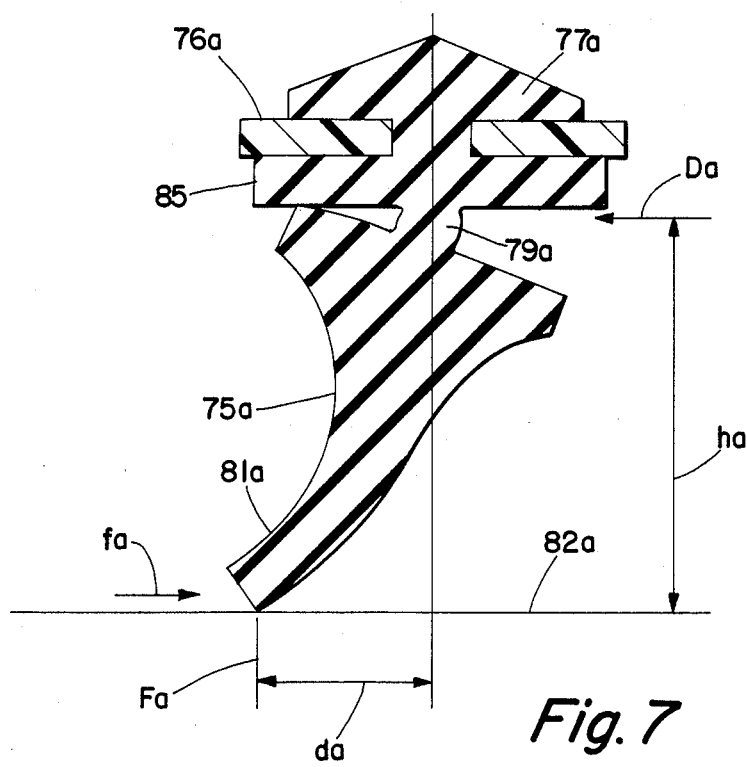

Referring now to the prior art showings of FIGS. 6 and 7, the advantages of the instant invention will become more apparent. The traditional prior art design of pivotal hinge is shown in FIG. 6, while that of an elastic hinge is shown in FIG. 7, both requiring a considerable force couple to accomplish the flip of the wiper element from side to side. In FIG. 6 wiper element 75 is retained in backing strip 76, trapping head 77 within channel 78, with interconnecting neck 79 projecting through entrance slot 80. While head 77 is securely trapped in channel 78 there is some freedom of movement therein and head 77 may rock slightly from side to side, with one extreme of movement depicted in FIG. 6. The majority of the accommodation for side to side movement of wiper element 75, however, occurs in the pivotal neck section 79. Wiper lip 81 engages windshield surface 82 with the normal down loading provided by the spring of a conventional wiper arm (not shown), being reacted to by the windshield loading indicated by arrow F.

As noted, this type of pivotal hinge action occurs primarily by rotation of neck 79 within slot 80, placing wiper tip 81 at a dimension d from a centerline passing through the center of neck 79, or the pivot location. This results in a moment about the hinge equal to $F \times d$ being placed upon wiper element 75. In order for wiper element 75 to flip over to an opposite angular orientation relative to backing strip 76, a second moment is developed, formed by the frictional force at the wiping lip, indicated by arrow f at the distance h. Distance h is the height of the pivot location at neck 79 above windshield 82.

FIG. 7 shows another conventional prior art design, this however, being an elastic type hinge. In FIG. 7, the same numerals and leters with the letter a appended thereto are used as are used in FIG. 6 to describe a similar condition wherein a considerable moment must be developed at the wiper lip 81a and windshield 82a interface, in order to flip wiper element 75a. In the FIG. 7 showing hinge 79a corresponds to neck 79 of FIG. 6 and is the location where primary flexing occurs; but in this instance wiper element 75a is retained in backing strip 76a by means of enlarged head 77a and support section 85 at either side of backing strip 76a.

In both of these designs it is apparent that friction force f, fa is very limited in magnitude since it is obtained by the friction between an elastomer such as rubber and wet glass. Also, as the rubber sets with age, dimension d, da continually increases, placing wiper lip 81, 81a further from the respective pivot location. Both of these effects make the flipping action very marginal.

In the design of the instant invention however, no similar couple is required since there is no comparable dimension d, da in the ideal situation. In such design the hinge is always located above the wiper lip and the hinge or pivot point moves with the wiper lip throughout the flip. Rubber set of wiper element 11, 62 will occur as well due to aging and deflection of the wiper element, but the respective wiper lip will remain substantially directly below the pivot location, resulting in a relatively small equivalent dimension d, da, since the hinge is not stationary.

We claim:

1. A windshield wiper assembly, comprising a backing strip, and
    a wiper element received in said backing strip, said assembly adapted for support in a windshield wiper mechanism and to be reciprocably swept across the surface of a windshield,
    said backing strip comprising an elongated, semi-rigid member adapted to conform to the curvature of a windshield and having a channel with an entrance therein at the lower portion thereof, said entrance being disposed between a pair of inwardly directed, oppositely disposed and transversely spaced arms of said backing strip, the lower surface of said arms forming a bearing surface, said arms being supported by a pair of spaced legs depending from an inner transverse face of said backing strip, thereby forming said channel,
    said wiper element being an integral extrusion of elastomeric material comprising
    an elongated body part terminating in a wiper lip at the lower portion thereof,
    a back section forming an upper portion of said body,
    a narrow neck extending upwardly from said body, and
    an enlarged head at the upper end of said neck, said body back section, said neck and said head being movable as a unit without substantial relative flexure, said head being received in said backing strip channel for free movement therein between extreme angular end positions relative to said backing strip, and being restrained thereby at the end positions to support said wiper element relative to said backing strip, said neck extending through said entrance into engagement with said body, and said back section being curved and rollably engageable with said bearing surface of said backing strip for supporting said wiper lip at substantially the same distance from said backing strip at different angular orientations between said wiper element and said backing strip.

2. The wiper assembly set forth in claim 1 wherein said back section of said wiper element is in a circular curve having said wiper element lip at the center of said curve.

3. The wiper assembly set forth in claim 1 wherein said neck of said wiper element is substantially the same width as said entrance to said backing member and is curved inwardly toward said head to a smaller dimension to provide clearance for angular movement of said neck within said entrance of said backing member.

4. The wiper assembly set forth in claim 3 wherein said neck of said wiper element is in the shape of an involute tooth.

5. The wiper assembly set forth in claim 4 wherein said back of said wiper element is substantially the same width as said bearing surface and said body of said wiper element tapers gradually down to said wiper lip, said wiper lip being of smaller transverse dimension than said entrance to said backing strip channel.

6. A windshield wiper assembly, comprising
    a backing strip, and
    a wiper element retained in said backing strip for angular rocking movement relative thereto upon reciprocation of said wiper assembly across the windshield of a vehicle by a wiper mechanism,
    said backing strip comprising a member of extended length having a channel therein with a narrow entrance opening, said wiper element comprising a body extrusion of elastomeric material, said body terminating in a narrow wiper lip at the bottom portion thereof and having a curved back portion adapted for rolling engagement with a lower surface of said backing strip, said curved back portion being of circular curvature having said wiper lip at the center of said circular curve so that as said backing element is reciprocated in forward and reverse directions causing angular displacement of said wiper element relative to said backing strip with different points of engagement therebetween, said wiper lip will be positioned at substantially the same dimension from said backing strip in all angular dispositions of said wiper element, and
    means on said wiper element for retaining said wiper element in the channel of said backing strip for relatively free angular displacement therein, said retaining means comprising a curved tooth portion of said body member projecting upwardly through said entrance into said channel and terminating in an enlarged head of greater transverse dimensions than said entrance, said curved tooth portion being substantially nonbendable relative to said body member.

7. The wiper assembly set forth in claim 6 wherein said wiper lip is positioned substantially vertically below said point of contact between said wiper element and said backing strip in any angular disposition of said wiper element.

* * * * *